Aug. 18, 1942.    F. P. GARDNER    2,293,056
APPARATUS FOR ABSTRACTING AND PREPARING FIBERS FROM FIBER-BEARING PLANTS
Filed April 26, 1938    3 Sheets-Sheet 1
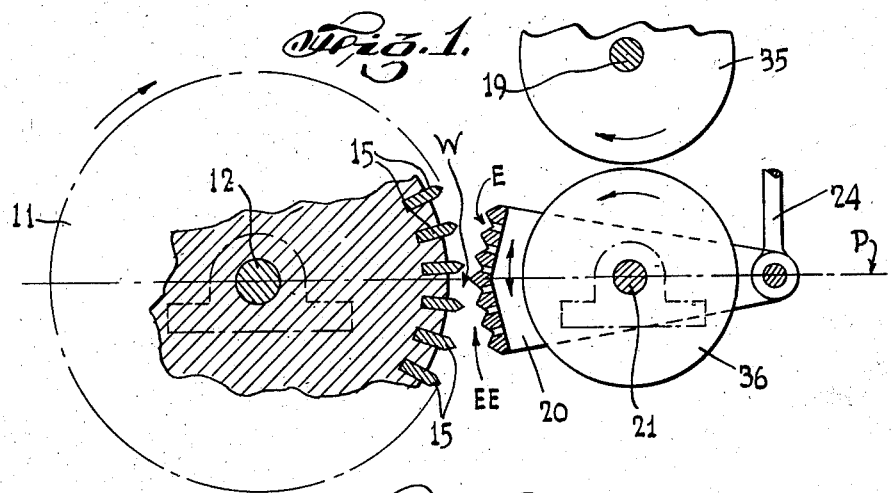
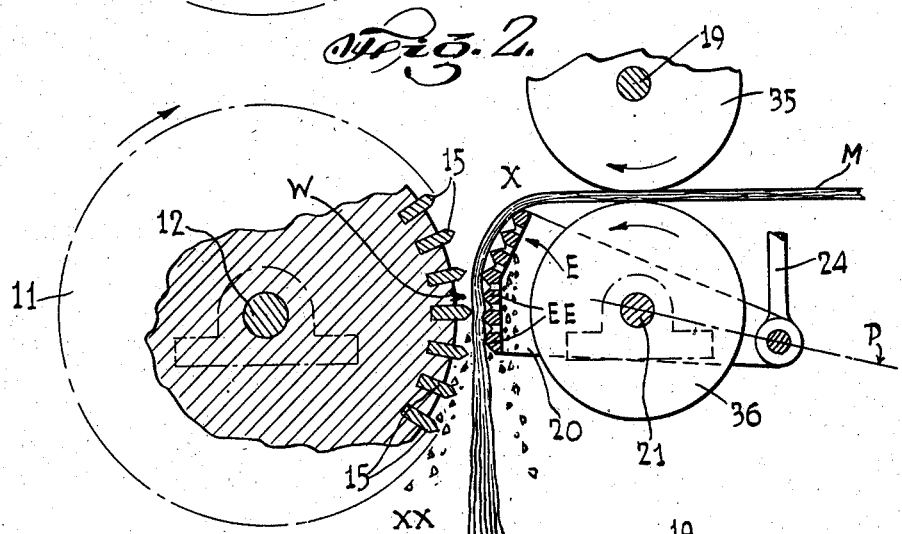
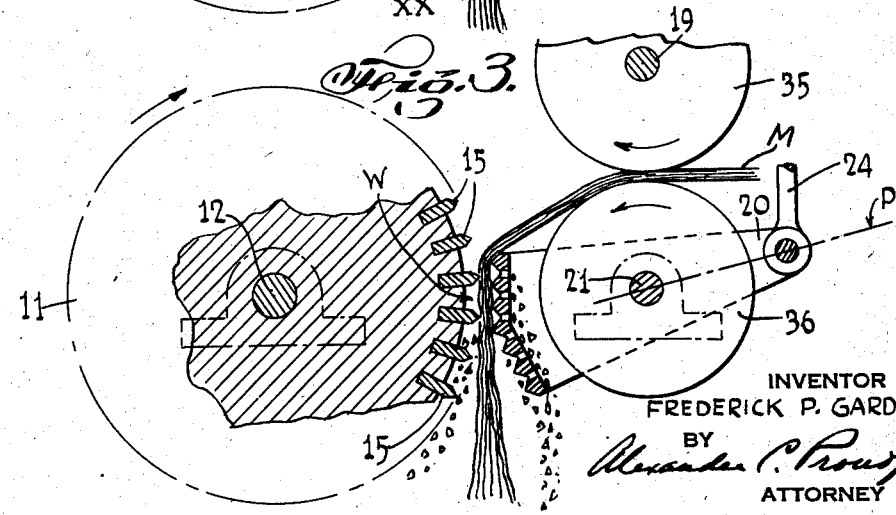
INVENTOR
FREDERICK P. GARDNER
BY
Alexander C. Proudfit
ATTORNEY

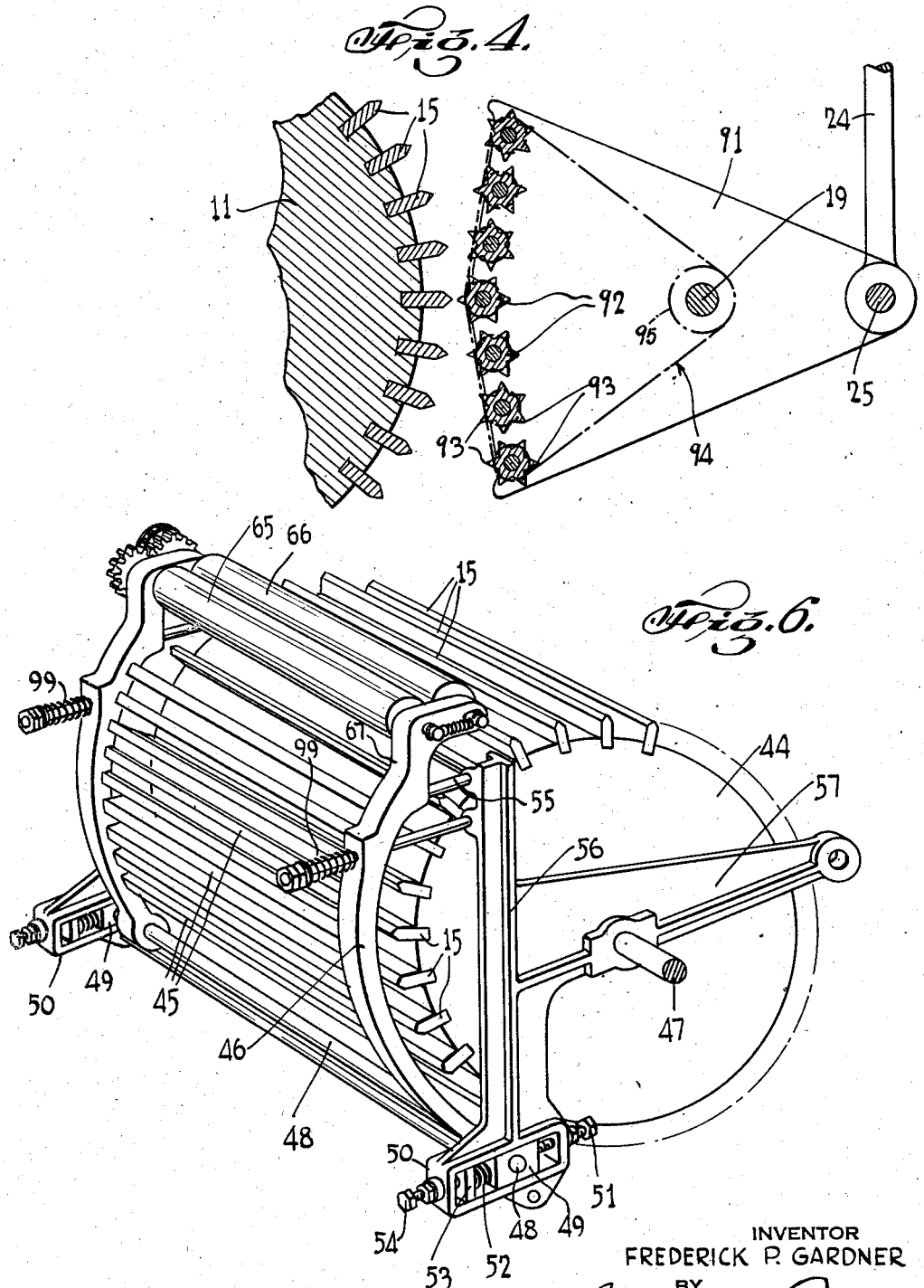

Aug. 18, 1942.  F. P. GARDNER  2,293,056
APPARATUS FOR ABSTRACTING AND PREPARING FIBERS FROM FIBER-BEARING PLANTS
Filed April 26, 1938  3 Sheets-Sheet 3

INVENTOR
FREDERICK P. GARDNER
BY
ATTORNEY

Patented Aug. 18, 1942

2,293,056

UNITED STATES PATENT OFFICE 2,293,056

APPARATUS FOR ABSTRACTING AND PREPARING FIBERS FROM FIBER-BEARING PLANTS

Frederick P. Gardner, New York, N. Y.

Application April 26, 1938, Serial No. 204,414

9 Claims. (Cl. 19—24)

This invention relates to the abstraction and preparation of fibers from fiber-bearing plants, such as the leaves of various members of the genus to which the pineapple of commerce belongs, and of the sansevieria, henequen, abaca and like plants, also from the stalks and like sources of fibers known as bast-fibers such as flax, hemp, ramie and the like, to name only a few well-known and representative examples of a wide range of sources of plant fibers and allied products susceptible of commercial and profitable recovery by the novel method which I have disclosed and claimed herein.

The present invention, while not limited to utilization in connection with the illustrative examples described in the present application, relates also to the provision of apparatus by which that method may be carried into effect, and in pursuance of this general object, a particular object of the present invention is to provide a machine by which may be effected a more complete recovery of the fibers and allied products from pineapple leaves or ramie stalks, for example, than has heretofore been possible, either by machines, or hand methods of abstracting the fibers.

The pineapple leaf contains, in a fleshy matrix, a double series of fibers, of which the layer at the front of the leaf is embedded in a relatively thick body of fleshy material, somewhat less firmly held than are the fibers in the posterior layer, where the matrix is of a tough, rubbery character. Owing to the difficulty in extracting the posterior fibers, only the first-named front series has so far been abstracted by hand methods, and the residue has been thrown away, wasting a large proportion of useful fiber. The fiber of ramie surrounds a woody core, held together in the form of a ribbon by a large quantity of gum, which requires severe mechanical treatment not only to remove the fiber from the stalk, but also to remove the outer bark adhering to the fiber. The abstraction of ramie fiber is carried out by hand methods, the plant stems being soaked in water and the bark scraped off by native labor, who produce about ten pounds of cleaned fiber per day. The above, and many other valuable fibers are limited in their use, for lack of an efficient mechanical means for abstracting the fibers.

Under such conditions, and as the result of many years of experimentation and trial of various methods of procedure in the extraction of plant fibers, I have devised a machine for abstracting and preparing fiber from pineapple leaves and ramie stalks and other valuable fibers from leaf and bast fiber plants, which comprises a series of co-ordinated mechanisms each adapted to carry out a step of my novel method. This series includes mechanisms for treating the fibrous material between edged instruments working simultaneously against both faces of the fibrous material, while drawing it backward and forward therebetween, and feeding the material progressively between the edged instruments, whereby the non-fibrous components associated with the fibers are scarified by the co-action of the edged instruments working in non-intersecting paths, and are simultaneously removed from the faces of the material, and from the individual fibers.

In the preferred form of machine, the mechanism carrying out the next step of my novel method after the first stage above briefly described, is characterized by means for working the material against an edged blade, preferably against a series of such edged blades in rapid succession, such means including another edged instrument, or series thereof which are applied to the other side of the material, the last-named series of edged instruments being constructed and arranged to move to and fro across the face of the first-named series of edged instruments, in such a manner that the material is drawn backward and forward between the edged instruments.

The non-fibrous components are repeatedly scarified and worked and are removed simultaneously from both sides of the fibrous structure, by this mechanism, while at the same time the fibrous material is fed forward progressively between the complemental series of edged instruments. Said mechanism for exerting simultaneous scarifying action at both sides of the fibrous material is a feature of my machine which is completely novel and of greatest importance, and may be embodied in a suitable series of scarifying couples comprising as many units as may be found desirable in the treatment of any given material.

My novel machine comprises a mechanism for performing the further step of causing the fiber, thus pre-cleaned, to be worked through another series of similar edged instruments carried by a rotor, and thus moving constantly in a preferably arcuate path, the invention providing an oscillating force comprising a series of bars or edged instruments which are moved to and fro in an arcuate path parallel to that of the edged instruments in the rotor and closely adjacent thereto, the material being held yieldingly to control its progressive advancement under the action of said forwardly moving edged instruments, at the same time that the oscillating movement of the sector causes a backward and forward reciprocation of the material in its arcuate path, as it progresses in a forward direction.

According to the invention, the bars or edged instruments are caused to change their positions relatively to the surface of the material constantly and with such frequency that as the material moves forward every portion of its surface is removed, the non-fibrous components being completely culled away by the action of the edged instruments so that the disintegrated non-fibrous material is continuously removed.

By this means the accumulation of non-fibrous components is at all times obviated, and the machine operates in a self-cleaning manner. In fact due to the oscillation of these bars, their aggregate surface in contact with the material at all times is virtually the equivalent of an uninterrupted, continuous surface of large area rather than of an aggregation of spaced, linear regions of contact, such as the bars would present to the material if the series of bars was not oscillated bodily.

At the same time, and as part of the unitary operation constituted by the successive steps of the novel method, the complete fibrous structure of the fiber-bearing material, stripped of all non-fibrous components, and maintained in the true original parallel arrangement of its component fibers, is delivered without bruising, cutting or other impairment of its natural properties, as an entity for useful employment.

The above scarifying operation may be performed more than once, as by a suitable series of scarifying couples of the type including a rotor and an arcuate set of bars or edged instruments worked by an oscillating sector, and in each stage of the method the successive scarifying couples may be alternately arranged so that the rotor of each couple is disposed at the opposite side of the material, from the side at which the preceding rotor is disposed, or there may be a plurality of successive scarifying couples in which the rotors are disposed at the same side of the material.

Another object is to provide an oscillating scarifying head for fiber-abstracting apparatus of the class described, comprising a frame adapted to be moved in an arcuate path contiguous to the path of the material to be treated, and carrying a series of members rotatable about axes parallel with the axis of oscillation of said head, said rotatable members respectively having multiple lengthwise edges formed along their peripheries, and means to impart rotation to said members simultaneously to cause said edges to enter successively into scarifying contact with the face of said material.

Another object is to provide means, oscillating with such a scarifying head, or a scarifying head in which the means, acting in conjunction with the upper bar of the series of edges upon said head, maintain an even constant pressure upon said fibrous material as it is deflected into the bite of said oscillating heads and their coacting rotors.

Other objects and features of the invention will appear as the description of the particular physical embodiment selected for illustration of the invention progresses.

In the accompanying drawings, like characters of reference have been applied to corresponding parts throughout the several views which make up the drawings, in which:

Fig. 1 is a view in sectional elevation of a schematic nature showing one stage of apparatus suitable for carrying into effect my novel method for the abstraction and treatment of fibers from fiber-bearing plants.

Fig. 2 is a similar view showing the co-acting parts of the apparatus of Fig. 1 in a different operative position, the fibrous material being shown in place;

Fig. 3 is a similar view showing said co-acting parts and material in still another working position;

Fig. 4 is a similar view of apparatus for the intended purpose in the construction of which the invention has been embodied in a modified form.

Fig. 6 is a complete detail view in perspective of the auxiliary stage shown in Fig. 5.

Figure 5:
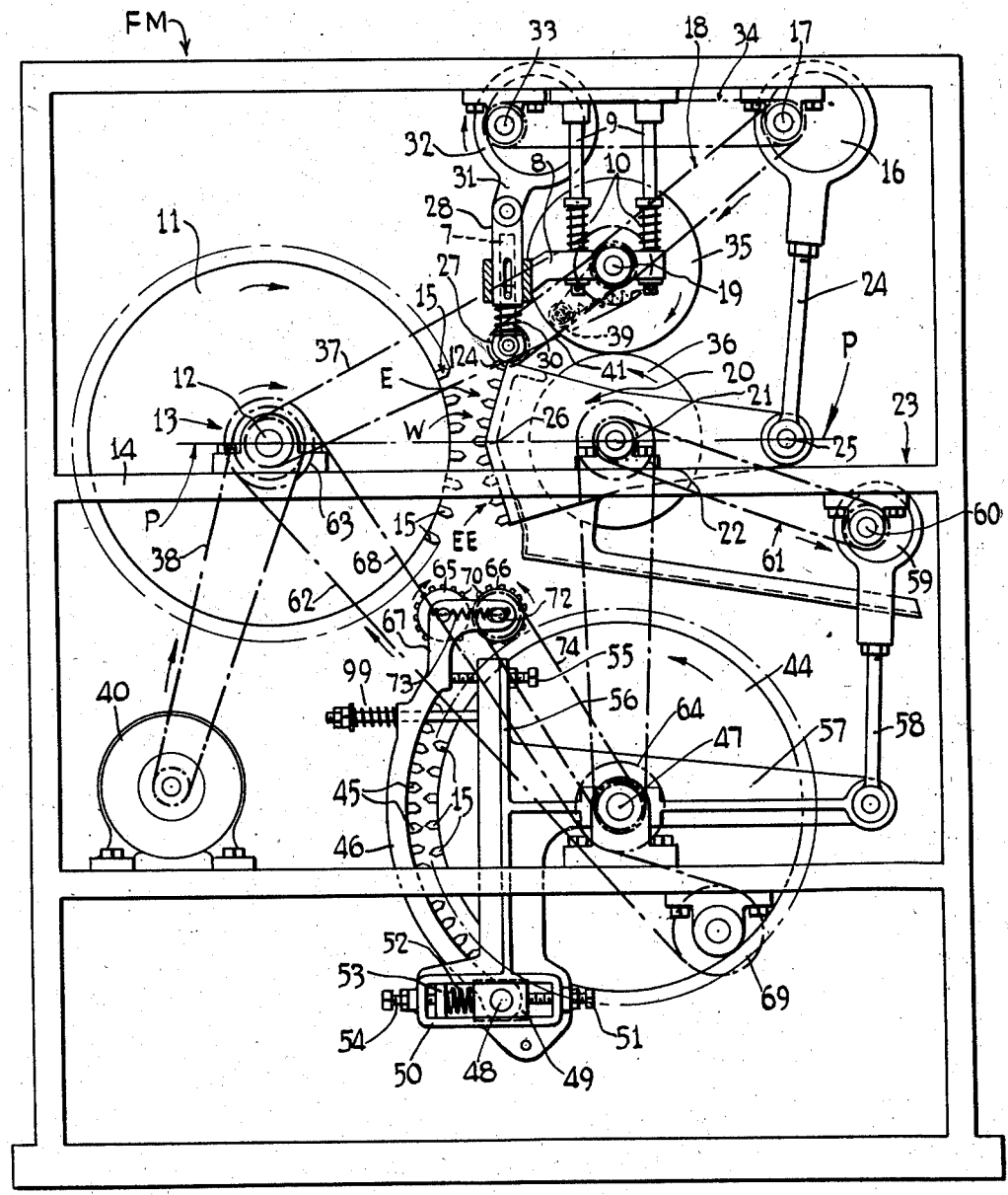
Fig. 5 is a view in side elevation of a machine in the construction of which has been embodied a stage of co-acting edged instrumentalities of the type shown in Figs. 1–3, and in conjunction therewith an auxiliary stage for further treatment of the fibers upon their emergence from the first stage.

In a now-preferred embodiment of the invention selected for illustration, and referring first to Figs. 1–3 inclusive, the part designated by the reference character 11 is a rotor carried by a shaft 12 journalled in bearings 13 mounted upon a supporting structure 14 and in the periphery of this rotor a circumferential series of spaced-apart edged instruments or scarifying blades 15 are shown, these blades being of any suitable structure and disposition adapted for carrying into effect the novel method of the present invention.

In the general arrangements the present invention is to be considered as in the nature of an improvement upon the machine shown and described in my Patent No. 2,177,646.

This rotor 11 can be driven constantly in a forward direction indicated by the arrow in Fig. 1, at desired speeds and the edged instruments 15 revolve in a circular orbit or path toward a working station W, for scarifying contact with the contiguous face of a section of fibrous material M (Figs. 2 and 3) from a fiber-bearing plant, either of the leaf-type or bast-fiber type.

The distinction between these types is well-known in the art, but may be briefly summarized as follows, viz., in the instance of fiber-bearing leaves the fibers are embedded in the fleshy matrix of the leaf structure, while in the bast-fiber plants the fibers surround and adhere to a woody core or stalk of non-fibrous material.

As set forth in the statement of the objects of the present invention contained in the opening paragraphs, a practical procedure for abstraction and treatment, at will, of either of the above types of fiber-bearing plants, is made available for the first time by the method and means herein disclosed and illustrated.

In pursuance of the invention, provision is made for an oscillating head 20, carried by a rock-shaft 21 journalled in bearings 22 mounted on a supporting structure 23 forming part of the framework of the machine, which is designated generally by the reference character FM. Oscillation of the head 20 is effected by any suitable means, indicated in the instance illustrated as operating through a pitman 24 at the rear of the head, to a suitable eccentric 16 driven by a shaft 17, chain 18 and shaft 19.

The working part of the head 20, over which the material M is led, as at X, Fig. 2, comprises a double series E and EE of edged instruments or blades extending respectively upwardly and rearwardly as at E, and downwardly and rearwardly, as at EE, from the medial horizontal plane P of the head, which passes through the axis of rotation of the rock-shaft 21, and through the pivotal connection 25 at the side of the head, while the forward projection of the plane defines the salient 26 midway of the series of edged instruments E and EE, and when the head is in its mid-position this mid-plane of the head coincides with the plane common to the axes of rotation of the rotor and head respectively, as indicated by the dash-line in Fig. 1.

As the head moves up and down, co-acting with the rotor, several clearly defined operations are effected, viz., Firstly, the fibrous material is vigorously reciprocated up and down by the action of the head and causes a vigorous sidewards movement of the material above and below the plane joining the axes of rotation of the rotor and head.

Secondly, the forward rotation of the rotor advances the material constantly between the co-acting forces:

Thirdly, while the head is moving upwardly, the scarifying effect is increased greatly both above and below the mid-plane:

Fourthly, at the same time, two entirely different effects on the material are produced by the head co-acting with the rotor, viz., A. Above the plane, the edged instruments are drawing away from the rotor and are scarifying the material and culling away the non-fibrous material.

B. Below the plane, the edged instruments are exerting a compressive, kneading action, and also an intensive scarifying action due to the constantly and rapidly diminishing space into which the material is being worked between the converging faces of the head and rotor:

Fifthly, when the head descends, other equally well defined actions take place, exerting an intensified, kneading, scarifying and culling effect above and below the mid-plane:

A. Above the plane, the fibrous material is being worked with progressively increasing pressure as the upper part of the head moves convergently toward the periphery of the rotor:

B. Below the mid-plane, the lower face of the head is moving away from the rotor, and while there is some scarifying action, the chief effect at this region is a culling action, for the reason that the edges are being retracted by the head and tend to pull away the non-fibrous components from the material, a similar culling action being exerted at the other side of the material by the diverging movement of the blades on the rotor.

C. At the centre region, it will be observed that there is always an effective scarifying action at both sides of the fibrous material, due to the closer approach of the blades on the head to those on the rotor at this region, where the diverging action as between the opposed blades is negligible, there being the most intense scarifying action exerted by these opposed forces.

The foregoing favorable results of carrying into effect the novel method of the present disclosure may be summarized by noting that the undesired non-fibrous components are culled from the desired fibers after the original fiber-bearing plant material has been deflected over the upright face E of the oscillating head and into the V-shaped mouth which leads to the mid-plane scarifying region W this constituting the flexion step by which the fleshy matrix of a leaf or the woody substance of a stalk, as the case may be, is prepared for disintegration and separation from the fibers; then the non-fibrous material whatever its character, is worked at both sides by the opposed instruments of the head and of the rotor which draw it forward and downward into the maw of the kneading and scarifying stage, where it is subjected to these actions by the instruments which work into the fleshy or woody matter of the fibrous material and draw it down to the mid-plane region W of approach by the opposed instruments toward each other, to the closest extent consistent with non-intersecting of their paths.

From the region of that mid-plane, throughout the subsequent travel of the kneaded and scarified material downward, the action is that of culling away the disintegrated non-fibrous components as shown in Fig. 3, in the inverted V-shaped space which corresponds in shape to the V-shaped maw shown above the mid-plane in Fig. 2, but serves to afford the necessary clearance for discharge of the culled components of fleshy matrix or woody shives away from the fibrous skeleton, as the latter advances under the continuously forward urgence of the co-acting instruments.

It is found in practice that with the high frequency of the oscillations characteristic of this preferred mode of operating the vibrating head, co-acting with the rotor, the action upon the non-fibrous structure is that of a multiplicity of very rapid sweeping kneading and scarifying strokes rather than of blows or crushing impacts which might bruise, rupture or otherwise injure the fibers themselves; the rapid up-and-down movement of the fibrous material as it advances between the non-intersecting, co-acting instruments tends further to materially increase the disintegration of the non-fibrous components from the useful fibers, as it is worked by the co-acting instruments.

In pursuance of a stated object of the invention, provision is made of means, acting in conjunction with the upper bar 124, of the series of edges E upon the head (see Fig. 2), to maintain an even, constant pressure upon the fibrous material as it is deflected into the bite of said oscillating head and its co-acting rotor, and this means may be mounted upon a suitable plunger carried by the frame, as shown in Fig. 5.

The roller 27, in the illustrative embodiment, is carried by a plunger 7 fitted slidingly in the bore of a slide 28 mounted to reciprocate vertically in bearings carried by a bracket 8 mounted upon twin hangers 9 depending from the overhead frame structure FM, a spring 30 tending to maintain contact of the roller 27 with the upper margin of the head 20 adjacent to the upper bar 24 at all positions of the latter. The slide 28 is moved up and down in unison with the head 20 by a pitman 31 operated by an eccentric 32 on a shaft 33 driven by a chain 34 running from the shaft 17 which operates the head 20 through the eccentric 16 and pitman 24.

As indicated diagrammatically in Fig. 5, the supply of fibrous material, M, whether in the form of leaves, stalks or other suitable source of plant fiber is fed initially through the bite of a feed-roll-couple constituted by rolls 35—36, one of these rolls, as 35 (Fig. 5), being driven positively, as by shaft 19, to which runs a sprocket chain 37 from the rotor shaft 12, the latter being driven by the sprocket chain 38, running from the shaft of motor 40.

The shaft 19 of feed roll 35 is carried by the bracket 8, and coil springs 40 serve to bias the roll 35 yieldingly into engagement with the fibrous material. This yielding bias is independent of that exerted upon the roll 27 by the spring 30, to which reference has already been made. Provision is made, as by a known form of chain take-up, indicated schematically at 39, for compensating the slight changes in position of the feed roll 35 due to variations in thickness of the fibrous material passing through the bite of rolls 35—36; and like compensation is made effective for the larger oscillations of the roller 27, which roller is preferably driven positively, as by a chain 41 running from a sprocket wheel (not shown) on the shaft 19. Sufficient slack may be provided in the sprocket chain 37 to compensate for displacements of the shaft 19 and roll 35.

In further pursuance of the invention, the fibers XX (see Fig. 2), as they emerge from the first stage of treatment, upon leaving the divergent edged instrumentalities 15 and EE below the mid-plane P (see Fig. 1), preferably pass immediately to a second stage of treatment, in order to be subjected to a further scarifying and cleaning.

This secondary stage includes another constantly advancing rotary force, as 44, preferably taking the form of a drum with peripheral spaced blades 15 identical in arrangement with those described already in connection with the rotor 11, and which serve both to feed the fibers forward and to scarify the fibrous material in co-operation with the opposed instruments, such as the blades 45, mounted on a curved sector frame, as 46, supported for oscillation in arcuate parallelism around the axis of rotation of the rotor 44.

The curved frame 46 is desirably mounted pivotally, as at 48, in a block 49, confined slidingly within a frame 50 which preferably has a limit screw 51 to control the range of play of the said block toward the rotor, while a spring 52, in compression between the block and an adjustable abutment 53, set up by a screw 54 to regulate the tension on spring 52, affords a yielding bias of the sector 46 and its blades around the pivot 48 toward the rotor.

A limit screw 55 is preferably provided for the remote free end of the sector 46, being mounted in an upright 56 formed as part of a unitary structure with the frame or head 57 by which the sector 46 is mounted to oscillate around the axis of the shaft 47. Such oscillation may be accomplished by any suitable means, and in the instance illustrated a pitman 58 is actuated by an eccentric 59 on a shaft 60 driven by a sprocket chain 61, running from a sprocket (not shown) fast on the shaft 21 which rotates the feed roll 36, so that the operation of the second stage sector is in proper time with that of the first stage.

The rotor 44 is designed to rotate in substantially constant time relation with that of the rotor 11, and, for this purpose a sprocket chain 62 runs from a sprocket wheel 63 fast on the shaft 12 past a sprocket wheel 64 fast on the shaft 47. The chain 62 is shown as running around an idler 69 and past the sprocket wheel 64.

In order that the treated fiber running from the first stage to the second stage may be advanced positively from the former to the latter, provision is preferably made of a pair of feed rolls 65—66, supported rotatably on the upper free end 67 of the frame 46, and intergeared with each other, as at 70. The gear 66 has its shaft 72 journalled loosely in the part 67, and is biased toward the gear 65 by a tension spring 73, of which there may be one at each side of the part 67. This pair of gears is driven by a sprocket chain 74 running from shaft 47.

The spring 99 tends to bias the arm 46 toward the desired position for co-action of the edges 15 and 45 with each other upon opposite faces of the intervening fibrous material, which may be regulated with great nicety by the limit screw 55 to avoid intersection of the path of rotation of the blades on the rotor with the blades on the sector as it oscillates in its arcuate path. Adjustment of the sector 46 toward and away from the rotor is always effective around a pivot 48 bearing a fixed spaced position with relation to the path of revolution of blades 15 on the rotor, at the lower end of the sector, and limited at its upper end positively at the abutment screw 55, insures freedom from interference at any intermediate region, as between the rotor and sector while assuming optimum efficiency throughout their mutually adjacent areas.

In Fig. 4 is illustrated a modification of the scarifying head comprising a frame 91 adapted to be moved in an arcuate path contiguous to the path of the material to be treated, and a series of members 93 rotatable about axes parallel with the axis 21 of oscillation of said head, said rotatable member respectively having multiple lengthwise edges 92 formed along their peripheries, and means comprising an endless chain 94 driven by a sprocket wheel 95 on shaft 21, which is actuated by suitable driving connections, not shown, from a driving member of the machine. The chain 94 imparts rotation to the members 93 simultaneously to cause their edges 92 to enter successively into scarifying contact with the adjacent face of the material.

From the foregoing it will be understood that if the nut on pitman 24 be suitably adjusted, it will cause the throw of the head 20 to be altered, and thereby to change and intensify or diminish the scarifying action upon the adjacent face of the material; a similar change of intensity may be effected by speeding up the oscillations of the head in known fashion; and likewise the drum 11 may be turned at higher speed to increase its revolutions and thereby increase the intensity of the scarifying action.

What is claimed is:

1. Apparatus for abstracting and treating fibers from fiber-bearing plants, comprising a rotor member and an oscillating head having an upper bar, said members being provided with edged instruments adapted to co-operate in non-intersecting paths upon opposite faces of fibrous material, said oscillating head edges being disposed in a double series including several edges at each side of a medial plane passing through the axis of reciprocation of said head.

2. Apparatus for abstracting and treating fibers from fiber-bearing plants, comprising a rotor member and an oscillating head, said members being provided with edged instruments adapted to co-operate in non-intersecting paths upon opposite faces of fibrous material, said oscillating head edges being disposed in a double series including several edges at each side of a medial plane passing through the axis of reciprocation of said head, said double series presenting toward the opposed rotor a substantially dihedral arrangement of said edges.

3. Apparatus of the kind described, having the features claimed in claim 2, in which means are provided to rotate said rotor constantly forward, and means to oscillate said head so that the medial salient of the dihedral angle is moved upwardly and downwardly in an arcuate path disposed with a clearance relatively to the arcuate path of the rotor edges approximating the thickness of the fibrous material under treatment.

4. Apparatus of the kind described, having the features claimed in claim 2, in which means are provided to rotate said rotor constantly forward, and means to oscillate said head so that the medial salient of the dihedral angle is moved upwardly and downwardly in an arcuate path disposed with a clearance relatively to the arcuate path of the sector edges approximating closely the thickness of the fibrous material under treatment, while the edged instruments at each side of said medial salient of the head are moved alternately to a position substantially in the plane common to the rotational axes of the rotor and oscillating head, and to a position remote from the last named plane, thereby scarifying the fiber-bearing material, alternately compressing and retracting it, and culling the non-fibrous components from the useful fibers.

5. Apparatus of the kind described, having the features claimed in claim 2, in which means are provided to rotate said rotor constantly forward, and means to oscillate said head so that the medial salient of the dihedral angle is moved upwardly and downwardly in an arcuate path disposed with a clearance relatively to the arcuate path of the rotor edges approximating the thickness of the fibrous material under treatment, while the edged instruments at each side of said medial salient of the head are moved alternately to a position substantially in the transverse plane common to the rotational axes of the rotor and oscillating head, and to a position remote from said last-named plane, whereby the head acts intermittently in a forward direction to complement the constantly forwarding action of the rotor, and acts alternatingly upon said fiber-bearing material in opposition to said forwarding action, the fiber bearing material being thereby subjected to a reciprocating action lengthwise, while being scarified between the said co-operating edged instruments of the rotor and oscillating head respectively, said fiber-bearing material having the non-fibrous components culled therefrom throughout the region of co-action of said instruments upon the material.

6. Apparatus of the class described, having the features claimed in claim 1, in which means are provided, oscillating with said head and acting in conjunction with the upper bar of the series of said head, to maintain an even constant pressure upon said fibrous material, as it is deflected into the bite of said rotor and head.

7. Apparatus of the class described, having the features claimed in claim 1, in which provision is made of an auxiliary stage having a rotor, including a series of edged instruments around its circumference, a sector having an arcuate face including a series of edged instruments conforming to the contour of said rotor series, and means to oscillate said sector and its edged instruments bodily in an arcuate path concentric with the axis of rotation of said rotor, said auxiliary stage being adapted to work upon the fibers emergent from said first stage.

8. An oscillating scarifying head for fiber abstracting apparatus of the class described, having a rotor provided with edged instruments, said head comprising a frame adapted to be moved in an arcuate path contiguous to the path of the material to be treated, and a series of members rotatable about axes parallel with the axis of oscillation of said head, said rotatable members respectively having multiple lengthwise edged instruments formed along their peripheries, and means to impart rotation to said members simultaneously to cause said edged instruments to enter successively into scarifying contact with the face of said material, said edged instruments on the head moving to and fro in a non-intersecting path with relation to the edged instruments on the rotor, said edged instruments on the head being free from intermeshing relationship with any other part of said machine at its region of contact with said fibrous material.

9. Apparatus of the class described, having the features claimed in claim 1, in which a roll is provided, oscillating with said head and acting in conjunction with the upper bar of the series of edges upon said head, to maintain an even constant pressure upon said fibrous material as it is deflected into the bite of said rotor and head, and means to rotate said roll positively in the direction of feed of said material.

FREDERICK P. GARDNER.